United States Patent
Rolih (10) Patent No.: US 12,315,256 B2
(45) Date of Patent: May 27, 2025

(54) PLAY CARD GENERATION TOOL

(71) Applicant: Repetix, LLC, Rochester, MN (US)

(72) Inventor: Michael J. Rolih, Rochester, MN (US)

(73) Assignee: Repetix, LLC, Rochester, MN (US)

( * ) Notice: Subject to any disclaimer, the term of this patent is extended or adjusted under 35 U.S.C. 154(b) by 12 days.

(21) Appl. No.: 18/480,776

(22) Filed: Oct. 4, 2023

(65) Prior Publication Data

US 2024/0119733 A1  Apr. 11, 2024

Related U.S. Application Data

(60) Provisional application No. 63/414,172, filed on Oct. 7, 2022.

(51) Int. Cl.
*G06V 20/40* (2022.01)
*G06V 40/20* (2022.01)

(52) U.S. Cl.
CPC .............. *G06V 20/42* (2022.01); *G06V 40/23* (2022.01)

(58) Field of Classification Search
CPC ................................ G06V 20/42; G06V 40/23
USPC .......................................................... 348/157
See application file for complete search history.

(56) References Cited

U.S. PATENT DOCUMENTS

2014/0113719 A1* 4/2014 Lee ..................... A63F 13/212
463/31
2016/0253919 A1* 9/2016 Coiner ................ G06F 16/2428
463/31
2018/0241422 A1 8/2018 Wohl et al.
2020/0306638 A1 10/2020 Fear et al.
2021/0390877 A1 12/2021 Rolih

FOREIGN PATENT DOCUMENTS

WO  WO-2022099445 A1 * 5/2022 ............... G06T 7/73

OTHER PUBLICATIONS

International Searching Authority, "International Search Report and the Written Opinion", Application No. PCT/US2023/075923, Foreign Counterpart to U.S. Appl. No. 18/480,776, Mailed Jan. 8, 2024, pp. 1-23, WO.

* cited by examiner

*Primary Examiner* — John W Miller
*Assistant Examiner* — Omer Khalid
(74) *Attorney, Agent, or Firm* — Fredrikson & Byron, P.A.

(57) ABSTRACT

A computing device has non-transitory computer-executable instructions that, when executed by programmable processing circuitry of the computing device, cause the programmable processing circuitry of the computing device to: derive a play formation model from player positional formation data that is extracted from image data of a play prior to start of the play; derive a plurality of individual player movement models from player movement data that is extracted from image data of the play being run; combine the derived play formation model and the derived plurality of individual player movement models to create a play card data file; and transmit the play card data file to a plurality of wearable player electronic devices for display of the play card data file.

17 Claims, 9 Drawing Sheets

PLAY CARD GENERATION TOOL

RELATED CASE

This disclosure claims priority to U.S. provisional patent application No. 63/414,172, filed on Oct. 7, 2022.

TECHNICAL FIELD

This disclosure relates generally to use of image data to generate a play card for use in a sporting activity. Embodiments disclosed herein include devices, systems, and methods directed to more automated play card generation using image data as well as distribution of the generated play card to one or more wearable player electronic devices, such as to display the generated play card at each such one or more wearable player electronic devices.

BACKGROUND

Team sports invariably involve a series of practices incorporating a recursive, repetitive learning process in order to maximize performance. During such practices, coaches can keep copies of plays in notebooks and laptop computers. Likewise, during such practices, players can access copies of plays carried on them using a wristband type notebook.

However, creating a template of each such play to be executed over the duration of a practice can require the use of significant resources, usually necessitating inefficient, manual creation by a coach of each such play template to be executed over the duration of a given practice. Yet because these play templates are typically useful in facilitating the intended learning process, coaches typically do decide to expend the significant time it takes to manually create these play templates before a practice session and, thereby, create an opportunity cost associated with otherwise devoting that time to more valuable uses. Moreover, as the completive level of the sport increases, the number of play templates needing to be created can increase. Indeed, at certain competitive levels of sport, the play templates needing to be created for a given week of practice can change from one week to the next, and, as a result, the ability to use past created play templates can be less frequent despite the significant time and resources spent creating these play templates.

SUMMARY

In general, this disclosure relates to play card generation and transmission of such generated play card for display at a plurality of wearable player electronic devices for use in a sporting activity. Embodiments disclosed herein include devices, systems, and methods for using image data to generate a play card for use in a sporting activity. This can include automated play card generation based on the image data as well as distribution of the generated play card to wearable player electronic devices, such as to display the generated play card at each such wearable player electronic device. Such embodiments disclosed herein can facilitate more efficient use of resources to generate a number of play cards for subsequent use in a sporting activity practice session and, thereby, free up time and resources to be devoted to other uses. Embodiments of such automated play card generation disclosed herein can allow for display of detailed play information (e.g., instructions, such as a route to be run or a scheme to be blocked according to) specific to multiple, individual players at each of a plurality of wearable player electronic devices to help facilitate the intended learning process for that particular play during a practice session. Yet, at the same time, these embodiments can do so without creating significant additional work for a coach or staff to be able to deploy this useful display of detailed play information that is specific to multiple, individual players at each of a plurality of wearable player electronic devices to help facilitate the intended learning process during the practice session.

One embodiment includes a computing device having non-transitory computer-executable instructions that, when executed by programmable processing circuitry of the computing device, cause the programmable processing circuitry of the computing device to: derive a play formation model from player positional formation data that is extracted from image data of a play prior to start of the play; derive a plurality of individual player movement models from player movement data that is extracted from image data of the play being run; combine the derived play formation model and the derived plurality of individual player movement models to create a play card data file; and transmit the play card data file to a plurality of wearable player electronic devices for display of the play card data file.

In a further such embodiment, the non-transitory computer-executable instructions, when executed by programmable processing circuitry of the computing device, can cause the programmable processing circuitry of the computing device to: derive the plurality of individual player movement models from player movement data that is extracted from image data of the play being run by tracking each of a plurality of individual player movements to generate a plurality of player movement vectors each corresponding to player movement data for a different, individual player. In one specific such example, the plurality of player movement vectors, each corresponding to player movement data for a different, individual player, can be generated by using frame-by-frame image data.

Another embodiment includes a method. This method includes the steps of: deriving a play formation model from player positional formation data that is extracted from image data of a play prior to start of the play; deriving a plurality of individual player movement models from player movement data that is extracted from image data of the play being run; and combining the derived play formation model and the derived plurality of individual player movement models to create a play card data file.

A further embodiment of this method additionally includes transmitting the play card data file to a plurality of wearable player electronic devices for display of the play card data file at each of the plurality of wearable player electronic devices.

An additional embodiment includes a computing device having non-transitory computer-executable instructions that, when executed by programmable processing circuitry of the computing device, cause the programmable processing circuitry of the computing device to: receive image data of a sporting play, the image data of the sporting play including first image data captured prior to a start of the sporing play and second image data captured during the sporting play; use the first image data to derive a play formation model based on player positional formation data extracted from the first image data; use the second image data to derive a plurality of individual player movement models based on movement data of a plurality of individual players extracted from the second image data; and combine the derived play formation model and the derived plurality of individual player movement models to create a play card data file.

In a further embodiment of this computing device, the non-transitory computer-executable instructions, when executed by programmable processing circuitry of the computing device, can further cause the programmable processing circuitry of the computing device to: transmit the created play card data file to a plurality of wearable player electronic devices for display of the play card data file.

In a further embodiment of this computing device, the player positional formation data extracted from the first image data can include an alignment of the plurality of individual players relative to a reference point associated with a field of play at which the sporing play occurs. For example, the reference point associated with the field of play can be a football, and the player positional formation data extracted from the first image data can include the alignment of the plurality of individual players relative to the football. In such embodiment, the non-transitory computer-executable instructions, when executed by programmable processing circuitry of the computing device, can cause the programmable processing circuitry of the computing device to derive the play formation model by: (i) storing a reference position of the reference point, and (ii) measuring a distance from the reference point to each of the plurality of individual players. For example, the non-transitory computer-executable instructions, when executed by programmable processing circuitry of the computing device, can cause the programmable processing circuitry of the computing device to use the measured distance from the reference point to each of the plurality of individual players to determine a derived position in the play formation model for a plurality of player representative icons that correspond to the plurality of individual players captured in the first image data. The derived position in the play formation model for each one of the plurality of player representative icons can be associated with a location at the play formation model corresponding to the measured distance for a respective one of the plurality of individual players captured in the first image data.

In a further embodiment of this computing device, the non-transitory computer-executable instructions, when executed by programmable processing circuitry of the computing device, can cause the programmable processing circuitry of the computing device to derive the plurality of individual player movement models based on movement data of the plurality of individual players extracted from the second image data by generating a plurality of player movement vectors each corresponding to player movement data for a different, individual player. In various applications, the second image data includes a plurality of image frames captured during the sporting play, and the non-transitory computer-executable instructions, when executed by programmable processing circuitry of the computing device, can cause the programmable processing circuitry of the computing device to generate the plurality of player movement vectors using the plurality of image frames captured during the sporting play. Accordingly, in one embodiment, the non-transitory computer-executable instructions, when executed by programmable processing circuitry of the computing device, can cause the programmable processing circuitry of the computing device to derive a position of each different, individual player in each of the plurality of image frames captured during the sporting play and use the position of each different, individual player in each of the plurality of image frames captured during the sporting play to create the plurality of player movement vectors each corresponding to one of the different, individual players. In one such example, the non-transitory computer-executable instructions, when executed by programmable processing circuitry of the computing device, can cause the programmable processing circuitry of the computing device to perform a frame-by-frame analysis of the plurality of image frames captured during the sporting play including registering a plurality of pixels of a first frame, of the plurality of image frames captured during the sporting play, according to a reference scheme and then analyzing each of the plurality of registered pixels of a second, subsequent frame, of the plurality of image frames captured during the sporting play, according to the reference scheme. In another such example, the non-transitory computer-executable instructions, when executed by programmable processing circuitry of the computing device, can cause the programmable processing circuitry of the computing device to create the plurality of player movement vectors each corresponding to one of the different, individual players by comparing: (i) the first image data captured prior to the start of the sporing play to a first subframe of the plurality of image frames captured during the sporting play to determine a first change in position of each one of the different, individual players, and (ii) the first subframe of the plurality of image frames captured during the sporting play to a second, subsequent subframe of the plurality of image frames captured during the sporting play to determine a second, subsequent change in position of each one of the different, individual players. In yet another such example, the plurality of player movement vectors can represent the plurality of individual player movement models using a plurality of player vector icons, corresponding to the plurality of individual players captured in the second image data, and each of the plurality of player vector icons can represent: (i) a pathway along which each one of the corresponding plurality of individual players moves, and (ii) and a direction of movement along the pathway during the sporting play.

In a further embodiment of this computing device, the non-transitory computer-executable instructions, when executed by programmable processing circuitry of the computing device, can further cause the programmable processing circuitry of the computing device to receive user input to adjust at least one of the derived plurality of individual player movement models by adjusting at least one of: a direction of a movement pathway of the at least one of the derived plurality of individual player movement models and a length of the movement pathway of the at least one of the derived plurality of individual player movement models to create an adjusted player movement model. In a further example of such embodiment, the non-transitory computer-executable instructions, when executed by programmable processing circuitry of the computing device, can further cause the programmable processing circuitry of the computing device to display the adjusted player movement model, receive user confirmation input of the adjusted player movement model, and, upon receiving the user confirmation input, save the adjusted player movement model in association with the play card data file.

In a further embodiment of this computing device, the non-transitory computer-executable instructions, when executed by programmable processing circuitry of the computing device, can further cause the programmable processing circuitry of the computing device to receive user reference point input to set a preset distance relative to a reference point, associated with a field of play at which the sporing play occurs, defining an area within which the image data of the sporting play is to be captured.

Another embodiment includes a method of creating a play card data file. This method can include the steps of: receiving image data of a sporting play, the image data of the sporting play including first image data captured prior to a start of the sporing play and second image data captured during the sporting play; using the first image data to derive a play formation model based on player positional formation data extracted from the first image data; using the second image data to derive a plurality of individual player movement models based on movement data of a plurality of individual players extracted from the second image data; and combining the derived play formation model and the derived plurality of individual player movement models to create the play card data file.

In a further embodiment of this method, the method can further include a step of transmitting the play card data file to a plurality of wearable player electronic devices for display of the play card data file at each of the plurality of wearable player electronic devices.

In a further embodiment of this method, the second image data includes a plurality of image frames captured during the sporting play including a first subframe and a second subframe, where the second subframe is captured at a time after the first subframe. The second image data can be used to derive the plurality of individual player movement models based on movement data of the plurality of individual players extracted from the second image data by, at least in part, generating a plurality of player movement vectors each corresponding to player movement data for a different, individual player by comparing (i) the first image data captured prior to the start of the sporing play to the first subframe to determine a first change in position of each one of the different, individual players, and (ii) the first subframe to the second subframe to determine a second, subsequent change in position of each one of the different, individual players. The plurality of player movement vectors can represent the plurality of individual player movement models using a plurality of player vector icons, corresponding to the plurality of individual players captured in the second image data, and each of the plurality of player vector icons can represent: (i) a pathway along which each one of the corresponding plurality of individual players moves, and (ii) and a direction of movement along the pathway during the sporting play. In one further such example, the method can additionally include receiving user input to adjust at least one of the derived plurality of individual player movement models by adjusting at least one of: a direction of a movement pathway of the at least one of the derived plurality of individual player movement models and a length of the movement pathway of the at least one of the derived plurality of individual player movement models to create an adjusted player movement model; displaying the adjusted player movement model and receiving user confirmation of the adjusted player movement model; and saving the adjusted player movement model in association with the play card data file.

The details of one or more examples of the disclosure are set forth in the accompanying drawings and the description below. Other features, objects, and advantages of the disclosure will be apparent from the description and drawings, and from the claims.

BRIEF DESCRIPTION OF DRAWINGS

The following drawings are illustrative of particular examples of the present invention and therefore do not limit the scope of the invention. The drawings are not necessarily to scale, though embodiments can include the scale illustrated, and are intended for use in conjunction with the explanations in the following detailed description wherein like reference characters denote like elements. Examples of the present invention will hereinafter be described in conjunction with the appended drawings.

DETAILED DESCRIPTION

The following detailed description is exemplary in nature and is not intended to limit the scope, applicability, or configuration of the invention in any way. Rather, the following description provides some practical illustrations for implementing examples of the present invention. Those skilled in the art will recognize that many of the noted examples have a variety of suitable alternatives.

Embodiments are disclosed herein, and illustrated in the accompanying drawings, using football as a non-limiting example of a sporting activity. However, the embodiments disclosed herein can be applied to other types of sporting activities, such as baseball/softball, basketball, hockey, volleyball, as other non-limiting examples.

Figure 1:
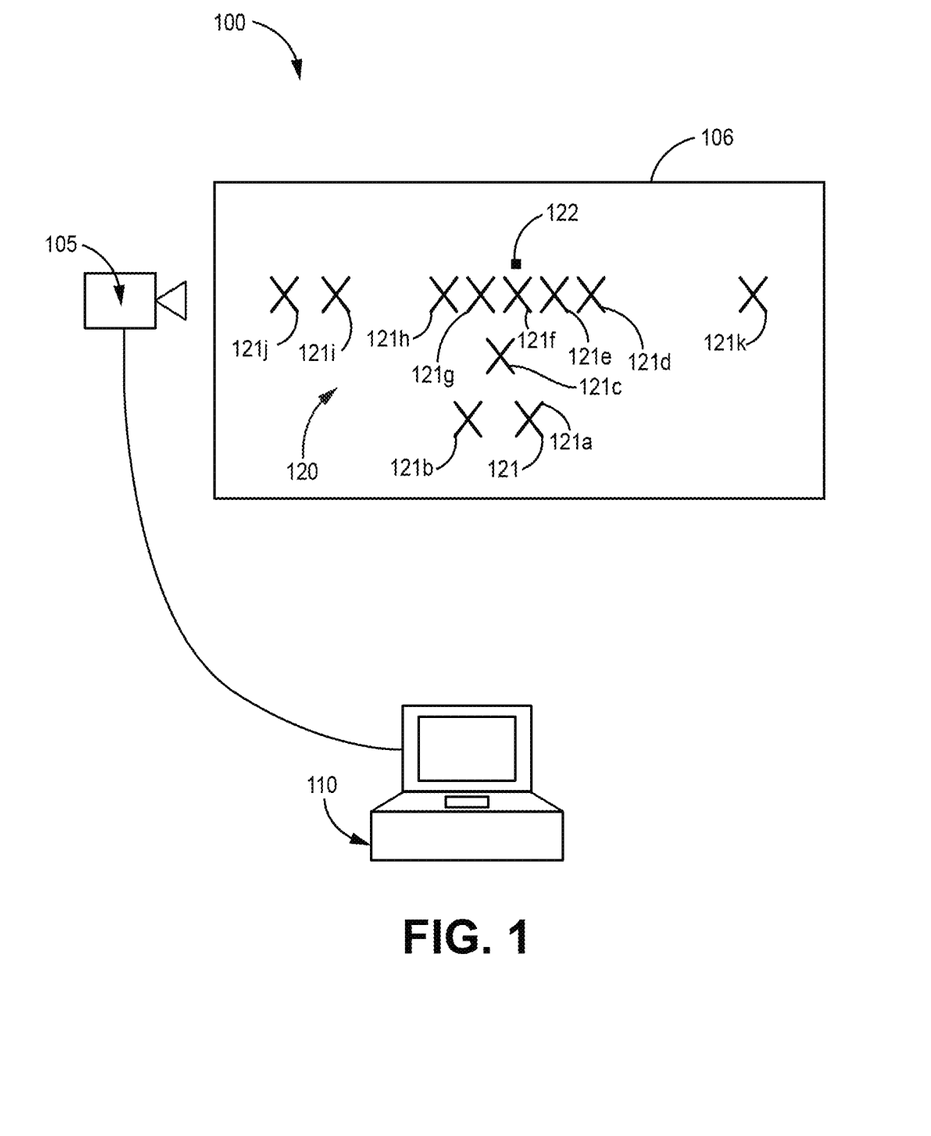
FIG. 1 is a schematic block diagram of an embodiment of a system for capturing image data of player positional formation data of a play prior to start of the play.

FIG. 1 is a schematic block diagram of an embodiment of a system 100 for capturing image data of player positional formation data of a play prior to start of the play.

The system 100 can include a camera 105 and a computing device 110. The camera 105 can be positioned to capture image data of a sporting activity, for instance a practice session of a sporting activity (e.g., football) both before the play is started and while the play is being run. The camera 105 can be connected to the computing device 110 via a data communication link 115 (e.g., wireless connection), and the camera 105 can capture image data (e.g., video) of the sporting activity and transmit this captured image data to the computing device 110. The computing device 110 can be located at or near the location of the sporting activity, or the computing device 110 can be a remote server located remotely from the camera 105 and the sporting activity (e.g., computing device 110 serves as a "cloud"). The image data captured by the camera 105 can be streamed to the computing device 110, or the image data captured by the camera 105 can be uploaded from another device (e.g., remote server; computing device at or near practice session; SD card; etc.) to the computing device 110 at a later time after the captured image data has been saved as a non-transitory image data file. The image data file can be, as illustrative examples, a MP4, MOV, or WMV image data file type. As such, the computing device 110 can serve to provide the play card generation as an on-field capability or the computing device 110 can serve to provide the play card generation as a later-in-time coach office workflow away from the practice session. The computing device 110 can include non-transitory computer-executable instructions that, when executed by programmable processing circuitry of the computing device 110, cause the programmable processing circuitry of the computing device 110 to perform one or more actions in relation to the image data received from the camera 105. In some examples, the non-transitory computer-executable instructions stored at the computing device 110 can, when executed by programmable processing circuitry of the computing device 110, cause the programmable processing circuitry of the computing device 110 to transmit one or more commands to the camera 105, such as a begin image capture command, a terminate image capture command, and/or an adjust viewing angle or zoom at the camera 105.

FIG. 1 illustrates the system 100, via the camera 105, capturing a frame 106 image data of player positional formation data 120 of a play prior to start of the play (e.g., prior to the start of a play to be run as part of a practice session). The player positional formation data 120 can include an alignment of a plurality of players 121 relative to a reference point 122 (e.g., a football, other ball used in a sporting activity, reference line on a field of play, etc.) and/or relative to others of the plurality of players 121. The camera 105 captures image data (e.g., video, picture) of the player positional formation data 120 of the play prior to start of the play, and this captured image data of the player positional formation data 120 of the play prior to start of the play (e.g., frame 106) can be transmitted to the computing device 110.

In some embodiments, the system 100 can be configured to use one or more user-input reference points to inform the portion(s) of the captured image data to be used in generating the play card. For example, a user can provide one or more reference points that can be used to set a portion of the captured image data that is to be used in generating the paly card. As one specific such example, a user could input a preset distance behind a ball (e.g., behind the reference point 122) (e.g., ten yards behind the ball) and/or a preset distance in front of the ball (e.g., forty yards in front of the ball) to define the corresponding portion of the captured image data that is to be used in generating the paly card, with any other portion of the captured image data outside of the preset distance behind and/or in front of the ball excluded from use in generating the play card. This user input to define reference points to inform the portion(s) of the captured image data to be used in generating the play card can be helpful in creating the accuracy of the play card generation function as well as to improve processing efficiency of the captured image data.

Figure 2:
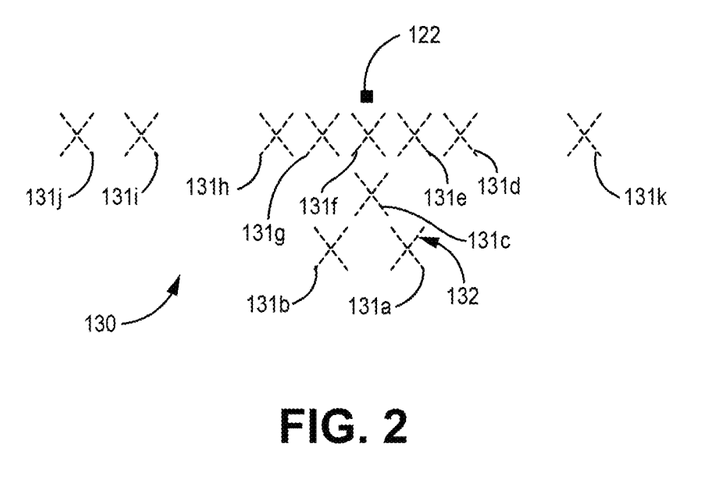
FIG. 2 is a schematic illustration of an embodiment a play formation model derived from the player positional formation data of a play prior to start of the play of FIG. 1.

FIG. 2 illustrates a schematic illustration of an embodiment a play formation model 130 that is derived from the player positional formation data 120 of the play prior to start of the play of FIG. 1. As noted, the camera 105 can transmit, via the data communication link 115, to the computing device 110 the captured image data of the player positional formation data 120 of the play prior to start of the play. The computing device 110 can then use this received captured image data of the player positional formation data 120 of the play prior to start of the play to derive the play formation model 130, an example of which is illustrated at FIG. 2.

In particular, the non-transitory computer-executable instructions stored at the computing device 110 can, when executed by programmable processing circuitry of the computing device 110, cause the programmable processing circuitry of the computing device 110 to use the received captured image data of the player positional formation data 120 of the play prior to start of the play to derive the play formation model 130. As one example, the non-transitory computer-executable instructions stored at the computing device 110 can use the received image data of the player positional formation data 120 to (i) store a reference position of the reference point 122 (e.g., a football), and then (ii) measure a distance from the reference point 122 to each player 121*a*-121*j*. Then, the non-transitory computer-executable instructions stored at the computing device 110 can use the measured distance from the reference point 122 to each player 121*a*-121*k* of the plurality of players 121 to determine a derived position for each model player 131*a*-131*k* to be included in the play formation model 130 that is derived from the player positional formation data 120. Then, using the derived position for each model player 131*a*-131*k*, the play formation model 130 can be created by associating a player representative icon 132 with the derived position for each model player 131*a*-131*k* (e.g., the player representative icon 132 is associated with a location at the play formation model that corresponds to that particular player 121's measured distance from the reference point 122), and the play formation model 130 can be saved as a play formation model data file. In some additional embodiments, the play formation model 130 (e.g., via the play formation data file) can be edited by a user. For example, the play formation model 130 can be edited by a user to select a portion of the captured image data corresponding to a player who was omitted from the generated play formation model 130. Then, a revised play formation model can be generated using the previously generated play formation model 130 plus the user selected portion of the captured image data.

Figure 3:
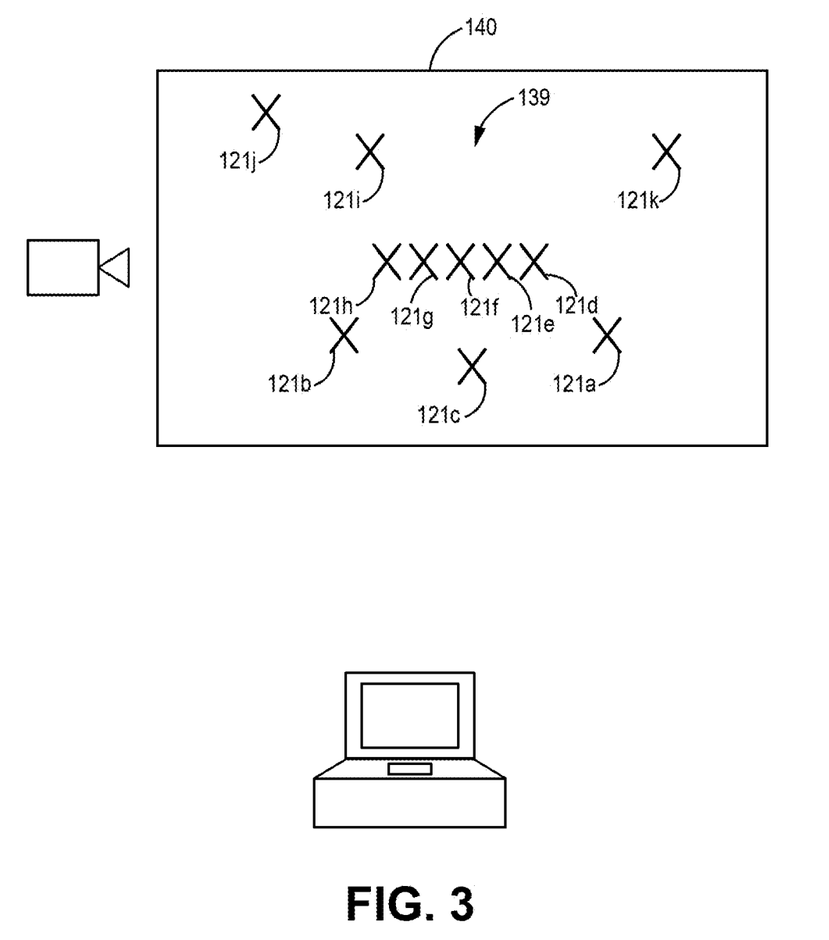
FIG. 3 is a schematic block diagram of the system of FIG. 1 deployed for capturing a first frame of image data that includes player movement data while the play is being run.
Figure 4:
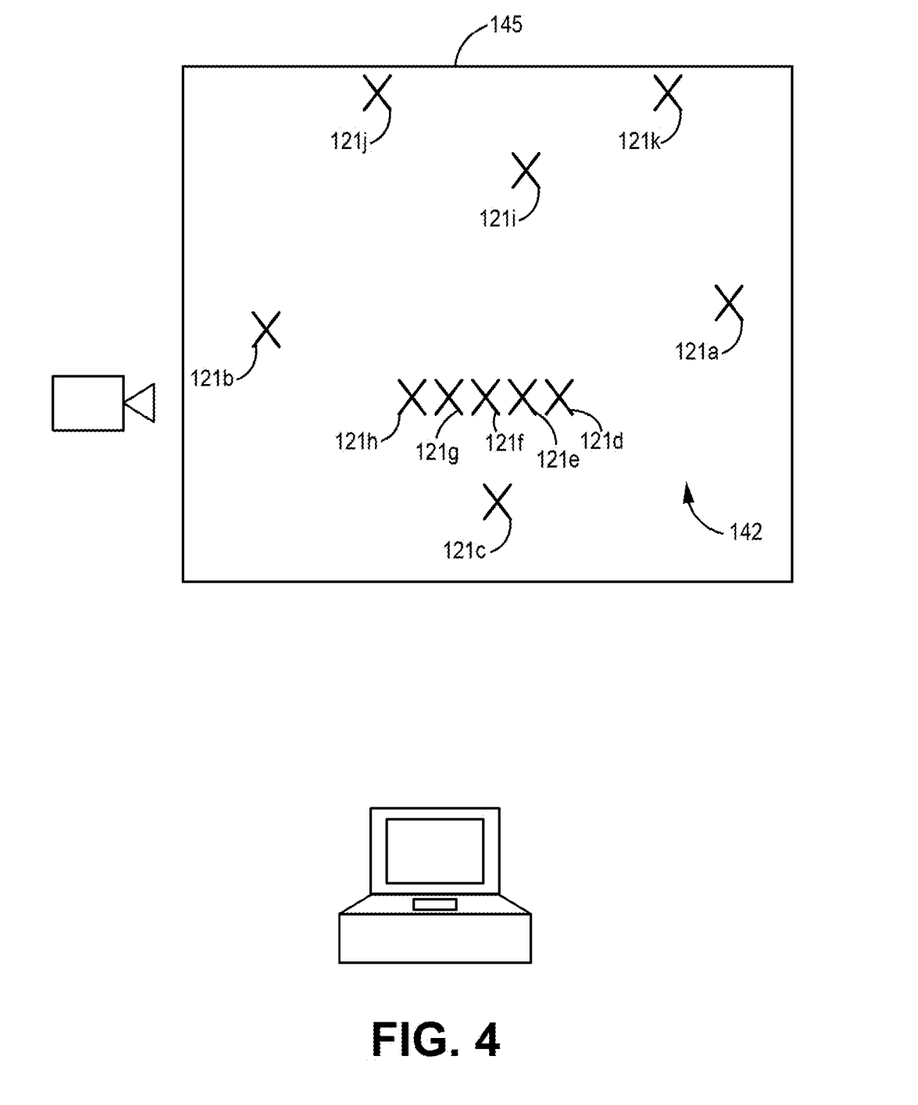
FIG. 4 is a schematic block diagram of the system of FIG. 1 deployed for capturing a second, subsequent frame of image data that includes player movement data while the play is being run.

From the player positional formation data, a play will be run. FIG. 3 is a schematic block diagram of the system 100 capturing a first frame 140 of image data that includes first player movement data 139 while the play is being run and after the player positional formation data has been captured. FIG. 4 is a schematic block diagram of the system 100 capturing a second, subsequent frame 145 of image data that includes second, subsequent player movement data 142 while the play is being run. As can be seen in comparing the first frame 140 and the second, subsequent frame 140, the location of at least some players 121 changes from the time the first frame 140 is captured to the time the second frame 145 is captured, for instance as certain positional players execute a specified play (e.g., wide receivers 121*k*, 121*i*, 121*j* run specified pass routes).

Figure 5:
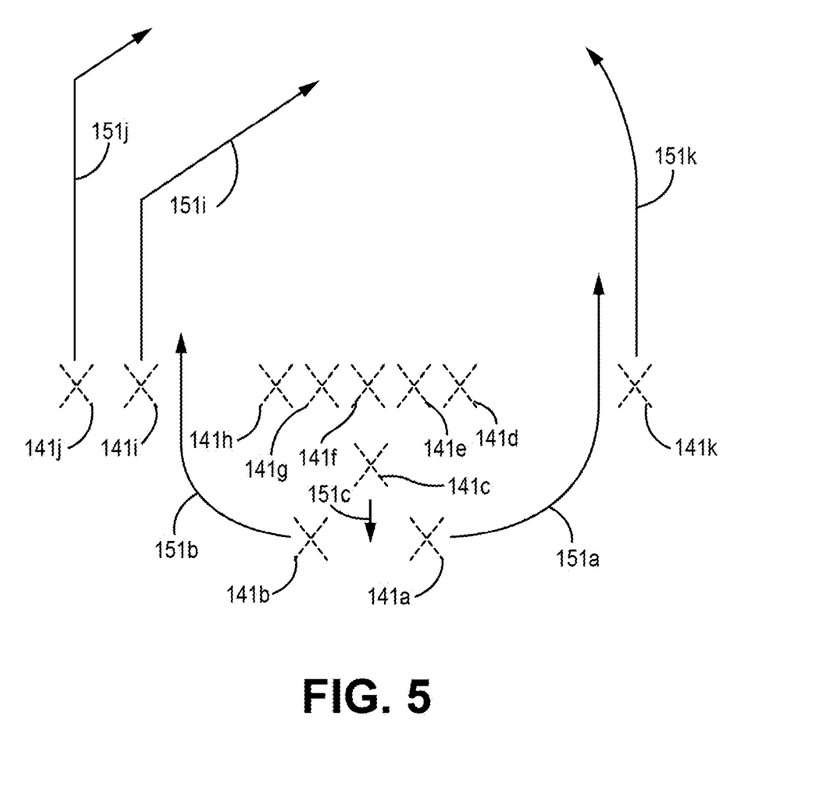
FIG. 5 is a schematic illustration of an embodiment of a plurality of individual player movement models derived from the player movement data of the first and second frames of image data while the play is being run.

In addition to the play formation model 130, the computing device 110 can use captured image data received from the camera 105 to derive player movement data that occurs while the play is being run (e.g., after the player positional formation data 120 has been captured). FIG. 5 is a schematic illustration of an embodiment of a plurality of individual player movement models 151a, 151b, 151c, 151i, 151j, 151k derived from the player movement data 139, 142 of the respective first and second frames 140, 145 of image data while the play is being run. As illustrated for this example, individual player movement models 151a, 151b, 151c, 151i, 151j, 151k can be vector icons that represent a pathway along which a specific player is to move during the play and a direction for traversing that pathway during the play. The camera 105 can transmit, via the data communication link 115, to the computing device 110 the captured image data of the first and second frames 140, 145 while the play is being run. The computing device 110 can then use this received captured image data of the first and second frames 140, 145, including the player movement data 139, 142 discerned from each frame 140, 145 of the play being to derive a plurality of individual player movement models 151a (player movement model for player 121a represented by model player 131a in the formation data and model player 141a in the movement data), 151b (player movement model for player 121b represented by model player 131b in the formation data and model player 141b in the movement data), 151c (player movement model for player 121c represented by model player 131c in the formation data and model player 141c in the movement data), 151i (player movement model for player 121i represented by model player 131i in the formation data and model player 141i in the movement data), 151j (player movement model for player 121j represented by model player 131j in the formation data and model player 141j in the movement data), 151k (player movement model for player 121k represented by model player 131k in the formation data and model player 141k in the movement data).

In particular, the non-transitory computer-executable instructions stored at the computing device 110 can, when executed by programmable processing circuitry of the computing device 110, cause the programmable processing circuitry of the computing device 110 to use the received captured image data of the player movement data 139, 142 discerned from a comparison of the respective first and second frames 140, 145 of image data while the play is being run to derive the plurality of individual player movement models 151a, 151b, 151c, 151i, 151j, 151k. As one example, the non-transitory computer-executable instructions stored at the computing device 110 can compare the received image data frames 140, 145 to (i) determine a change in position of each player 121a-121k from the initial formation captured in the frame 106 to the first frame 140, and (ii) determine a change in position of each player 121a-121k from the first frame 140 to the second frame 145. By so determining the change is position of each player 121a-121k from the initial formation frame 106 to a final frame at or near a conclusion of the play, the non-transitory computer-executable instructions stored at the computing device 110 can, when executed by programmable processing circuitry of the computing device 110, determine the plurality of individual player movement models 151a, 151b, 151c, 151i, 151j, 151k corresponding to the respective player 121a, 121b, 121c, 121i, 121j, 121k. Then, the non-transitory computer-executable instructions stored at the computing device 110 can use the determined change in position of each player 121a-121k across a plurality of captured image frames of player movement data 139, 142 to create the player movement model (e.g., player movement models 151a, 151b, 151c, 151i, 151j, 151k) for each such player. For instance, the player movement models 151a-151k can be created by associating a player representative icon 141a-141k with each player movement model 151a-151k, and the plurality of player movement models 151a-151k can be saved as a player movement model data file. Finally, play formation model data file, including the play formation model 130, and the player movement model data file, including the plurality of derived player movement models 151a-151k, can be combined to create a play card data file. In some examples, this play card data file can be transmitted to a plurality of wearable player electronic devices for display of the play card data file.

As one specific example of creating the player movement data file, the non-transitory computer-executable instructions stored at the computing device 110 can cause the received image data frames to be compared to one another in chronological order over the course of the play that is run. For each frame, the non-transitory computer-executable instructions stored at the computing device 110 can cause a location of each player present is that frame to be determined and stored in association with that frame. Then, with the location of each player determined for each frame, each frame can be compared to determine each player's movement model across the frames, resulting in the determination of the player movement models 151a-151k using the change in location of each player across the frames 106, 140, 145. Thus, while each frame 140, 145 can provide data relating to an instantaneous position of each player at the time that particular frame was captured, the non-transitory computer-executable instructions stored at the computing device 110 can cause the movement model for each player occurring between the captured instantaneous positions of each player across the frames to be extrapolated based on the determined location of each player from one frame to the next.

Figure 6:
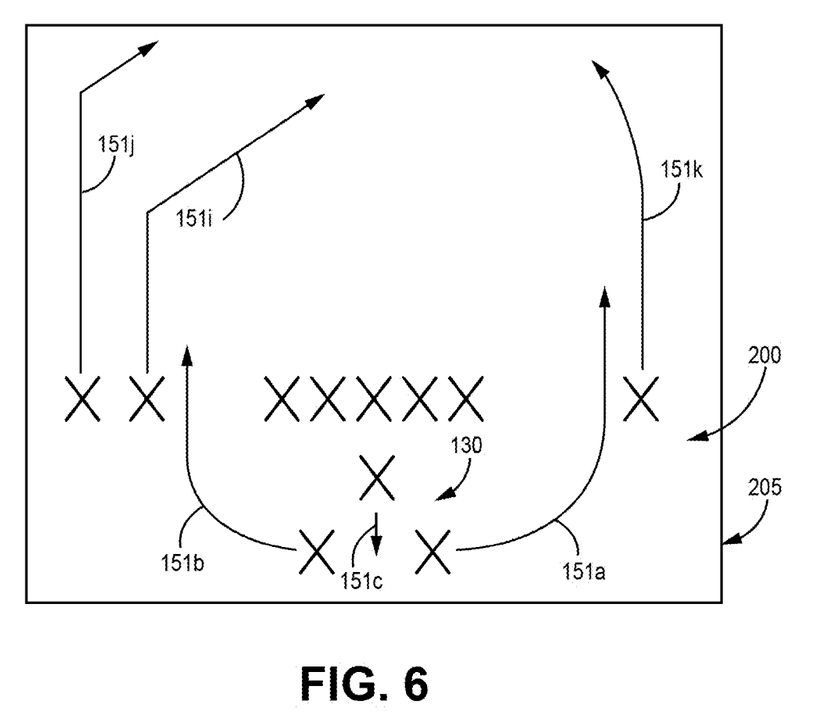
FIG. 6 is a schematic illustration of an embodiment of a play card data file that includes a combination of the derived play formation model, of FIG. 2, and the derived plurality of individual player movement models, of FIG. 5.

FIG. 6 is a schematic illustration of an embodiment of a play card data file 200. The play card data file 200 can include a combination of the derived play formation model 130 and the derived plurality of individual player movement models 151a, 151b, 151c, 151i, 151, j, 151k.

For example, the play card data file 200 can be displayed at a user interface 205 and user input can be received to edit any one or more of the player movement models 151a, 151b, 151c, 151i, 151, j, 151k of the play card data file 200 displayed at the user interface 205. For example, a user can provide input at the user interface 205 to adjust the player movement model 151k to change a directional path, length, and/or location of the player movement model 151k. For instance, the user can provide input at the user interface 205 to change the angle of the player movement model 151k from a left-angled post route to a right-angled post-route and/or to change the length of the player movement model 151k from extending fifteen yards as displayed initially for the player movement model 151k of the play card data file 200 to instead extend ten yards. As an example, the user input can be provided at the user interface 205 at the displayed player movement models 151a, 151b, 151c, 151i, 151, j, 151k of the play card data file 200—this could include clicking and dragging, or touching and holding if a touchscreen, at the displayed icon for the player movement model 151a, 151b, 151c, 151i, 151, j, 151k to adjust any such player movement model. Any such edits provided via the user input can be saved with the play card data file 200.

In one embodiment, the computing device 110 can store the play card data file 200 and transmit the play card data file 200 to a coach's portable electronic device for display at the user interface 205 included at the coach's portable electronic device. The coach can input any one or more edits to any one or more of the derived play formation model 130 and the derived plurality of individual player movement models 151a, 151b, 151c, 151i, 151, j, 151k, and these edits can be saved at the play card data file 200. As such, the play card data file 200 displayed at the user interface 205 included at the coach's portable electronic device can in some instances be considered a suggested play card data file and, upon receiving a confirmation input (e.g., after receiving any input edits to any one or more of the derived play formation model 130 and the derived plurality of individual player movement models 151a, 151b, 151c, 151i, 151, j, 151k) the play card data file can be considered as a finalized play card data file. Then, this finalized play card data file can be saved (e.g., with any such edits) at the computing device 110 and transmitted to any coach's portable electronic device and/or any one or more of a plurality of wearable player electronic devices.

Figure 7:
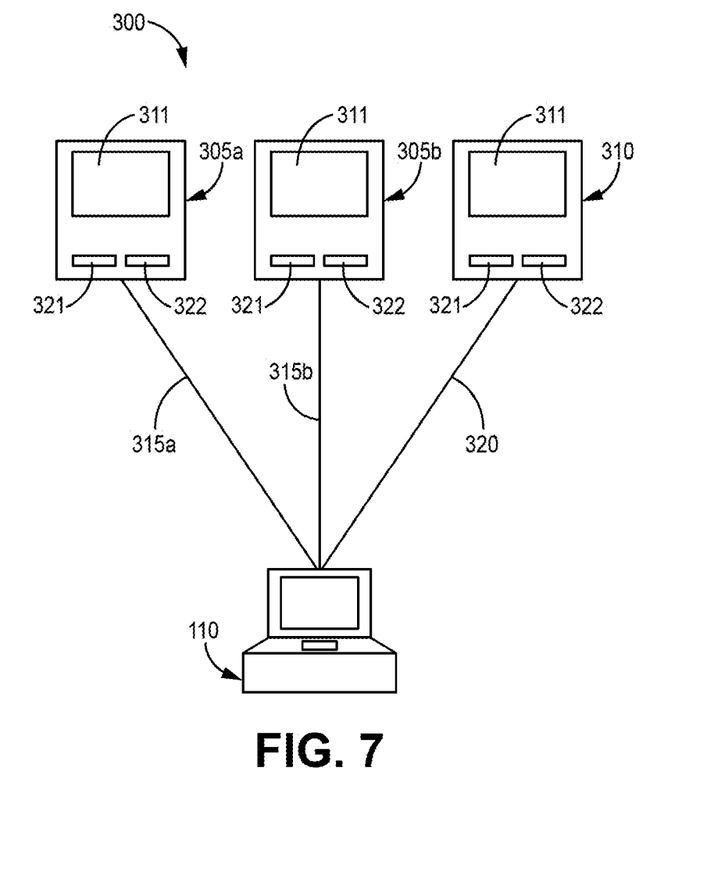
FIG. 7 is a schematic block diagram of an embodiment of a system for transmitting a play card data file, which includes the combination of the derived play formation model, of FIG. 2, and the derived plurality of individual player movement models, of FIG. 5, to a plurality of wearable player electronic devices for display of the play card data file at each of the plurality of wearable player electronic devices.

FIG. 7 is a schematic block diagram of an embodiment of a system 300 for transmitting a play card data file. The system 300 includes the computing device 100 as well as a plurality of wearable player electronic devices 305a, 305b and a coach portable electronic device 310. The computing device 110 can transmit the play card data file (e.g., a finalized play card data file), including the derived play formation model 130 and the derived plurality of individual player movement models 151a, 151b, 151c, 151i, 151, j, 151k, to one or more of the plurality of wearable player electronic devices 305a, 305b, via data communications link 315a, 315b, and/or the coach portable electronic device 310, via data communications link 320. The plurality of wearable player electronic devices 305a, 305b and/or the coach portable electronic device 310 can each include a display 311 that is configured to display the play card data file at the display 311.

Each of the wearable player electronic devices 305a, 305b and the coach portable electronic device 310 can include the display 311 as well as one or more user input mechanisms 321, 322. As noted, the display 311 can display the play card data file, including the derived play formation model 130 and the derived plurality of individual player movement models 151a, 151b, 151c, 151i, 151, j, 151k, received from the computing device 110. The one or more user input mechanisms 321, 322 can be configured to allow a user of the device 305a, 305b, 310 to provide user input to the device 305a, 305b, 310, for instance to change the content of the display 311. In addition, the coach portable electronic device 310 can be in communication with one or more of the wearable player electronic devices 305a, 305b, for instance through the computing device 110, so that the coach portable electronic device 310 can send a data signal to any one or more of the wearable player electronic devices 305a, 305b. For example, the coach can provide input relating to the derived play formation model (e.g., input changing a position of at least one player relative to the displayed formation model) and/or relating to the derived plurality of individual player movement models (e.g., input changing a directional path, length, and/or location of a specific player movement model) using the one or more user input mechanisms 321, 322, and this input at the coach portable electronic device 310 can be sent to one or more of the wearable player electronic devices 305a, 305b for display at the display 311 of the one or more wearable player electronic devices 305a, 305b.

The coach's portable electronic device 310 can be any one of a variety of device types, such as a cell phone, tablet, or laptop. The coach's portable electronic device 310 can access memory having an electronic playbook application stored thereon. The electronic playbook application can include multiple animated plays which may optionally be linked or segregated with associated notes from the coach and/or segments of the play being executed as described herein below. The electronic playbook application can further includes the ability to add further plays and/or modify existing plays according to the coach user's preferences.

The electronic playbook application can be a software application that enables the coach to provide various inputs, including the transfer button (e.g., user input mechanism 321) and the review prompt (e.g., user input mechanism 322). The electronic playbook application can further include a practice module which may be integrated with or accessed by the coaching computer module so as to receive and store plays and related input selected by a coach to be practiced, and further may receive and store time stamped and cut plays which have been called by the coaching computer module and stored. In addition, the electronic playbook application can further include a playbook generation module which can provide a software interface for a coach to generate plays, either on the coach's portable electronic device 310 or separately, away from practice on any computer device (not shown) which can access the coaching computer module.

The coach's portable electronic device 310 can enable a coach to transmit a selected, single animated playbook play from available plays within the electronic playbook application by actuating the transfer button which will cause the electronic playbook application to transfer the selected animated playbook play to all individual players and coaches who are wearing the wearable player electronic device 305a, 305b that is registered or otherwise linked to coach's portable electronic device 310 and/or the electronic playbook application, such as through computing device 110. As such, the ability of the computing device 110 to utilize captured image data to derive the play formation model 130 and the plurality of individual player movement models 151a, 151b, 151c, 151i, 151, j, 151k to create the play card data file can allow for more efficient population of the electronic playbook application by saving each newly created (e.g., and finalized) play card data file for access by the electronic playbook application.

Figure 8:
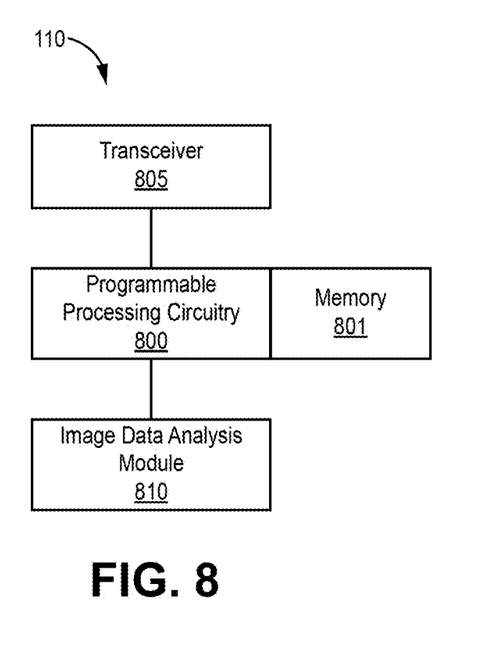
FIG. 8 is a block diagram of a computing device having non-transitory computer-executable instructions that, when executed by programmable processing circuitry of the computing device, cause the programmable processing circuitry of the computing device to create a play card data file.

FIG. 8 is a block diagram of the computing device 110 which has non-transitory computer-executable instructions that, when executed by programmable processing circuitry 800 of the computing device 110, cause the programmable processing circuitry 800 of the computing device 110 to create the play card data file as described herein. The computing device 110 can include programmable processing circuitry 800, non-transitory computer-readable storage article ("memory") 810 coupled to the programmable processing circuitry 800, transceiver 805 coupled to the programmable processing circuitry 800, and image data analysis module 810 coupled to the programmable processing circuitry 800.

As described previously herein, the computing device 110 can receive, via transceiver 805, image data captured by and from the camera. The memory 810 and/or image data analysis module 810 can store non-transitory computer-executable instructions that, when executed by programmable processing circuitry 800, can cause the programmable processing circuitry 800 to: derive the play formation model 130 from player positional formation data that is extracted from image data of a play prior to start of the play; derive the plurality of individual player movement models 151a, 151b, 151c, 151i, 151, j, 151k from player movement data that is extracted from image data of the play being run; combine the derived play formation model 130 and the derived plurality of individual player movement models 151a, 151b, 151c, 151i, 151, j, 151k to create the play card data file; and, in some embodiments, transmit the play card data file to a plurality of wearable player electronic devices and/or a coach device for display of the play card data file. Thus, in this way, the stored non-transitory computer-executable instructions, when executed by programmable processing circuitry 800, can cause the computing device 110 to use the received image data to derive the play formation model 130 and the plurality of individual player movement models 151a, 151b, 151c, 151i, 151, j, 151k to create the play card data file. And, the computing device 110, via the transceiver 805, can transmit this play card data file to a plurality of wearable player electronic devices and/or a coach device for display of the play card data file (e.g., and for input of edits to the play card data file so as to finalize the play card data file).

The image data analysis module 810 can store non-transitory computer-executable instructions that, when executed by programmable processing circuitry 800, can cause the programmable processing circuitry 800 to perform a frame-by-frame analysis to discern movement of players represented in the image data from frame-to-frame. For example, the image data analysis module 810 can store non-transitory computer-executable instructions that, when executed by programmable processing circuitry 800, can cause the programmable processing circuitry 800 to perform a frame-by-frame analysis to discern movement of players by registering pixels of a first frame according to a reference scheme and then analyzing each such pixel of subsequent frames according to this reference scheme. This pixel basis analysis on a frame-by-frame basis of the received image data can allow the image data analysis module 810 to discern the movement of players over the frames at a relatively precise level so as to increase accuracy of the generated play card data file and, thereby, help to minimize time needed for input edits to the play card data file.

Figure 9:
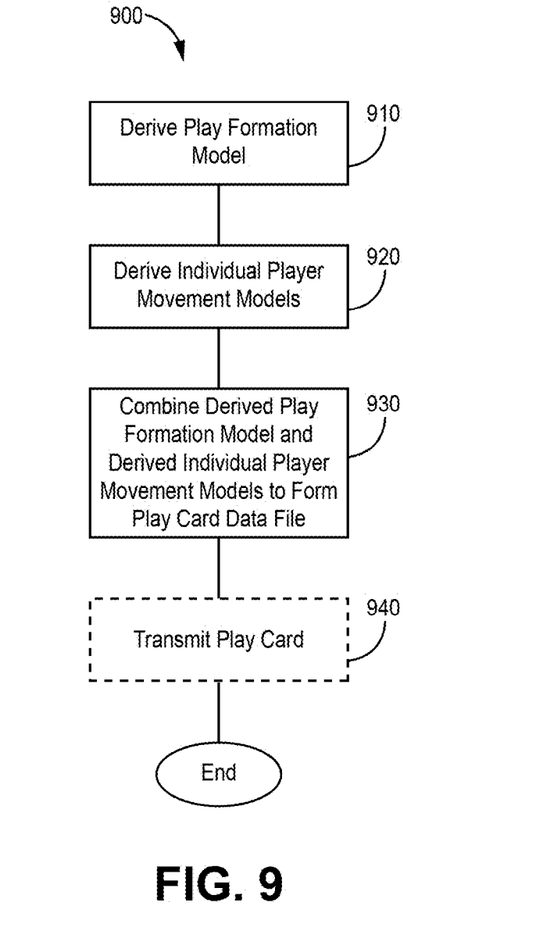
FIG. 9 is a flow diagram of an embodiment of a method for creating a play card data file.

FIG. 9 is a flow diagram of an embodiment of a method 900 for creating a play card data file. The method 900 can be carried at any one or more devices, including execution of the method 900 at the computing device 110.

At step 910, the method 900 includes deriving a play formation model. The play formation model can be derived, for example, using captured image data of the player positional formation data of the play prior to start of the play. For instance, the received captured image data of the player positional formation data of the play prior to start of the play can be used to (i) store a reference position of a reference point (e.g., a football), and then (ii) measure a distance from the reference point to each player represented in the captured image data. Then, the measured distance from the reference point to each player can be used to determine a derived position for each model player to be included in the play formation model that is derived from the player positional formation data. Then, using the derived position for each model player, the play formation model can be created by associating a player representative icon with the derived position for each model player, and the play formation model 130 can be saved as a play formation model data file.

At step 920, the method 900 includes deriving one or more (e.g., a plurality of) individual player movement models. The individual player movement models can be derived, for example, using captured image data received from the camera to derive player movement data that occurs while the play is being run (e.g., after the player positional formation data has been captured). For instance, image data frames capturing player movement data over time while the play is being run can be compared to derive the plurality of individual player movement models over that corresponding timespan. As one example, the received image data frames can be compared to (i) determine a change in position of each player represented in the image data from the initial formation captured in the initial frame to a first frame that is captured soon after the play has started, and (ii) determine a change in position of each player from that first frame to a second, subsequent frame captured at a time after the first frame and while the play is being run. By so determining the change is position of each player from the initial formation frame to a final frame at or near a conclusion of the play, the plurality of individual player movement models corresponding to the respective players can be determined. The determined change in position of each player across a plurality of captured image frames of player movement data to create the player movement model for each such player can be created by associating a player representative icon with each player movement model, and the plurality of player movement models can be saved as a player movement model data file.

At step 930, the method 900 includes combining the play formation model data file, including the derived play formation model, and the player movement model data file, including the plurality of derived player movement models, to create a play card data file. As such, the play card data file can include both the derived play formation model, for a time before the play is run, and the plurality of derived player movement models, for a time when the play is run.

Optionally, the method 900 can include, at step 940, transmitting the play card data file to one or more wearable player electronic devices and/or a coach portable electronic device. The play card data file can be configured for display at the one or more wearable player electronic devices and/or a coach portable electronic device.

In some such embodiments, the method 900 can include a step of receiving user input to edit the play card data file. As described elsewhere herein, input can be received in reference to the displayed play card data file to edit the derived play formation model and/or the plurality of derived player movement models.

Various examples of the disclosure have been described. Any combination of the described systems, operations, or functions is contemplated. These and other examples are within the scope of the following claims.

What is claimed is:

1. A computing device having non-transitory computer-executable instructions that, when executed by programmable processing circuitry of the computing device, cause the programmable processing circuitry of the computing device to:
   receive image data of a sporting play, the image data of the sporting play including first image data captured prior to a start of the sporing play and second image data captured during the sporting play;
   use the first image data to derive a play formation model based on player positional formation data extracted from the first image data;
   use the second image data to derive a plurality of individual player movement models based on movement data of a plurality of individual players extracted from the second image data by generating a plurality of player movement vectors each corresponding to player movement data for a different, individual player, wherein the plurality of player movement vectors represent the plurality of individual player movement models using a plurality of player vector icons, corresponding to the plurality of individual players captured in the second image data, and wherein each of the plurality of player vector icons represent: a movement pathway along which each one of the corresponding plurality of individual players moves, and a direction of movement along the movement pathway during the sporting play;

combine the derived play formation model and the derived plurality of individual player movement models to create a play card data file; and receive user input, associated with the play card data file, adjusting at least one of the derived plurality of individual player movement models by changing at least one of: a direction of the movement pathway of the at least one of the derived plurality of individual player movement models and a length of the movement pathway of the at least one of the derived plurality of individual player movement models to create an adjusted player movement model.

2. The device of claim 1, wherein the non-transitory computer-executable instructions, when executed by programmable processing circuitry of the computing device, further cause the programmable processing circuitry of the computing device to:

transmit the created play card data file to a plurality of wearable player electronic devices for display of the play card data file.

3. The device of claim 1, wherein the player positional formation data extracted from the first image data includes an alignment of the plurality of individual players relative to a reference point associated with a field of play at which the sporing play occurs.

4. The device of claim 3, wherein the reference point associated with the field of play is a football, and wherein the player positional formation data extracted from the first image data includes the alignment of the plurality of individual players relative to the football.

5. The device of claim 3, wherein the non-transitory computer-executable instructions, when executed by programmable processing circuitry of the computing device, cause the programmable processing circuitry of the computing device to derive the play formation model by: (i) storing a reference position of the reference point, and (ii) measuring a distance from the reference point to each of the plurality of individual players.

6. The device of claim 5, wherein the non-transitory computer-executable instructions, when executed by programmable processing circuitry of the computing device, cause the programmable processing circuitry of the computing device to use the measured distance from the reference point to each of the plurality of individual players to determine a derived position in the play formation model for a plurality of player representative icons that correspond to the plurality of individual players captured in the first image data.

7. The device of claim 6, wherein the derived position in the play formation model for each one of the plurality of player representative icons is associated with a location at the play formation model corresponding to the measured distance for a respective one of the plurality of individual players captured in the first image data.

8. The device of claim 1, wherein the second image data comprises a plurality of image frames captured during the sporting play, and wherein the non-transitory computer-executable instructions, when executed by programmable processing circuitry of the computing device, cause the programmable processing circuitry of the computing device to generate the plurality of player movement vectors using the plurality of image frames captured during the sporting play.

9. The device of claim 8, wherein the non-transitory computer-executable instructions, when executed by programmable processing circuitry of the computing device, cause the programmable processing circuitry of the computing device to derive a position of each different, individual player in each of the plurality of image frames captured during the sporting play and use the position of each different, individual player in each of the plurality of image frames captured during the sporting play to create the plurality of player movement vectors each corresponding to one of the different, individual players.

10. The device of claim 9, wherein the non-transitory computer-executable instructions, when executed by programmable processing circuitry of the computing device, cause the programmable processing circuitry of the computing device to perform a frame-by-frame analysis of the plurality of image frames captured during the sporting play including registering a plurality of pixels of a first frame, of the plurality of image frames captured during the sporting play, according to a reference scheme and then analyzing each of the plurality of registered pixels of a second, subsequent frame, of the plurality of image frames captured during the sporting play, according to the reference scheme.

11. The device of claim 9, wherein the non-transitory computer-executable instructions, when executed by programmable processing circuitry of the computing device, cause the programmable processing circuitry of the computing device to create the plurality of player movement vectors each corresponding to one of the different, individual players by comparing: (i) the first image data captured prior to the start of the sporing play to a first subframe of the plurality of image frames captured during the sporting play to determine a first change in position of each one of the different, individual players, and (ii) the first subframe of the plurality of image frames captured during the sporting play to a second, subsequent subframe of the plurality of image frames captured during the sporting play to determine a second, subsequent change in position of each one of the different, individual players.

12. The device of claim 1, wherein the non-transitory computer-executable instructions, when executed by programmable processing circuitry of the computing device, further cause the programmable processing circuitry of the computing device to display the adjusted player movement model, receive user confirmation input of the adjusted player movement model, and, upon receiving the user confirmation input, save the adjusted player movement model in association with the play card data file.

13. The device of claim 1, wherein the non-transitory computer-executable instructions, when executed by programmable processing circuitry of the computing device, further cause the programmable processing circuitry of the computing device to receive user reference point input to set a preset distance relative to a reference point, associated with a field of play at which the sporing play occurs, defining an area within which the image data of the sporting play is to be captured.

14. A method of creating a play card data file comprising:
receiving image data of a sporting play, the image data of the sporting play including first image data captured prior to a start of the sporing play and second image data captured during the sporting play;

using the first image data to derive a play formation model based on player positional formation data extracted from the first image data;

using the second image data to derive a plurality of individual player movement models based on movement data of a plurality of individual players extracted from the second image data by generating a plurality of player movement vectors each corresponding to player movement data for a different, individual player, wherein the plurality of player movement vectors represent the plurality of individual player movement models using a plurality of player vector icons, corresponding to the plurality of individual players captured in the second image data, and wherein each of the plurality of player vector icons represent: a movement pathway along which each one of the corresponding plurality of individual players moves, and a direction of movement along the movement pathway during the sporting play;

combining the derived play formation model and the derived plurality of individual player movement models to create the play card data file; and receiving user input, associated with the play card data file, adjusting at least one of the derived plurality of individual player movement models by adjusting at least one of: a direction of the movement pathway of the at least one of the derived plurality of individual player movement models and a length of the movement pathway of the at least one of the derived plurality of individual player movement models to create an adjusted player movement model.

15. The method of claim 14, further comprising:
transmitting the play card data file to a plurality of wearable player electronic devices for display of the play card data file at each of the plurality of wearable player electronic devices.

16. The method of claim 14,
wherein the second image data comprises a plurality of image frames captured during the sporting play, the plurality of image frames captured during the sporting play including a first subframe and a second subframe, the second subframe captured at a time after the first subframe, wherein using the second image data to derive the plurality of individual player movement models based on movement data of the plurality of individual players extracted from the second image data comprises generating the plurality of player movement vectors each corresponding to player movement data for a different, individual player by comparing (i) the first image data captured prior to the start of the sporing play to the first subframe to determine a first change in position of each one of the different, individual players, and (ii) the first subframe to the second subframe to determine a second, subsequent change in position of each one of the different, individual players.

17. The method of claim 16, further comprising:
displaying the adjusted player movement model and receiving user confirmation of the adjusted player movement model; and
saving the adjusted player movement model in association with the play card data file.

* * * * *